April 25, 1961
B. P. ARTERBURY
2,981,331
METHOD AND APPARATUS FOR TESTING TUBING
AND FOR SCRAPING MATTER FROM THE
INNER WALL THEREOF
Filed Jan. 9, 1957
4 Sheets-Sheet 1
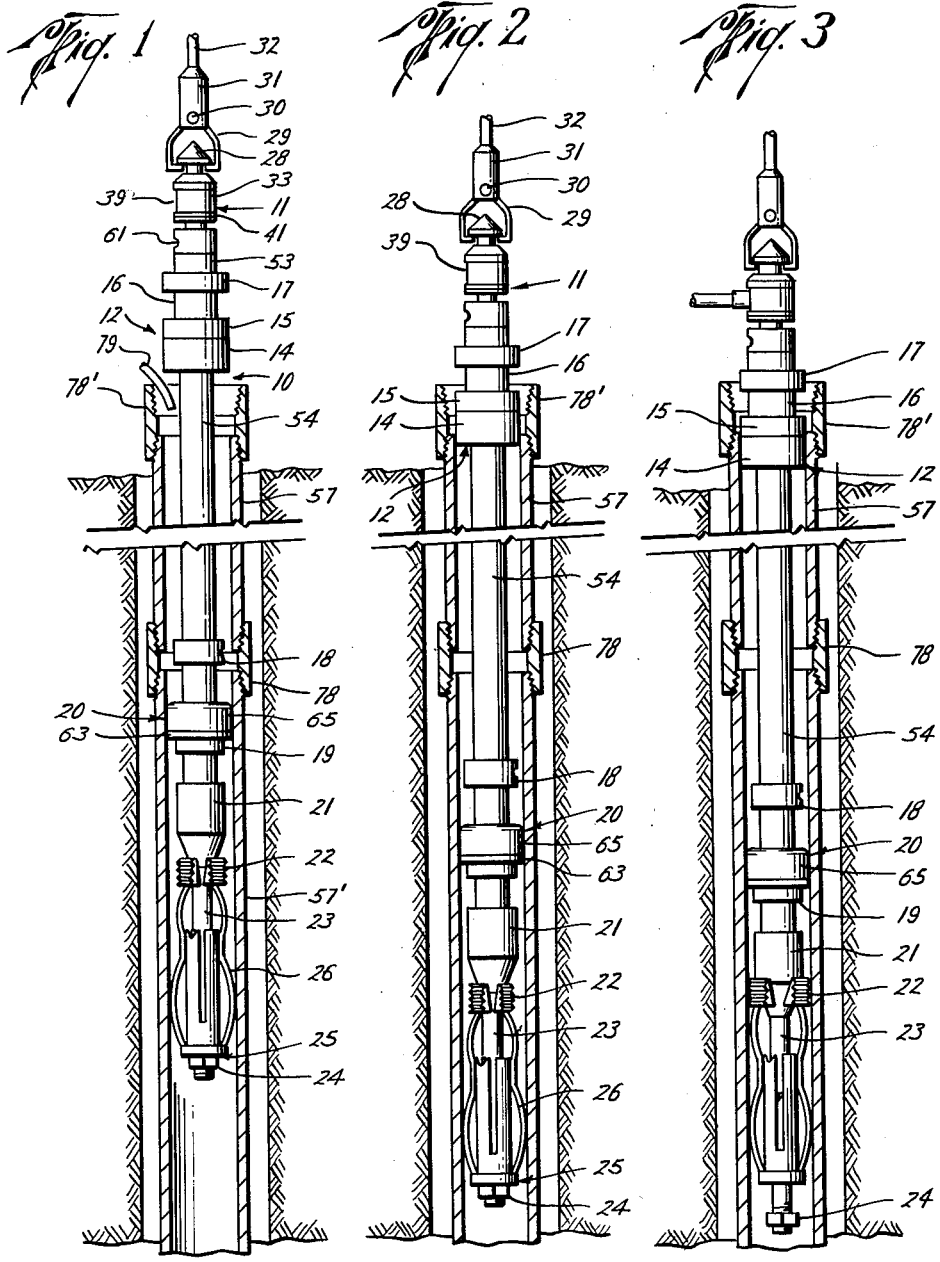
Bryant P. Arterbury
INVENTOR.
BY Wm. E. Ford
ATTORNEY

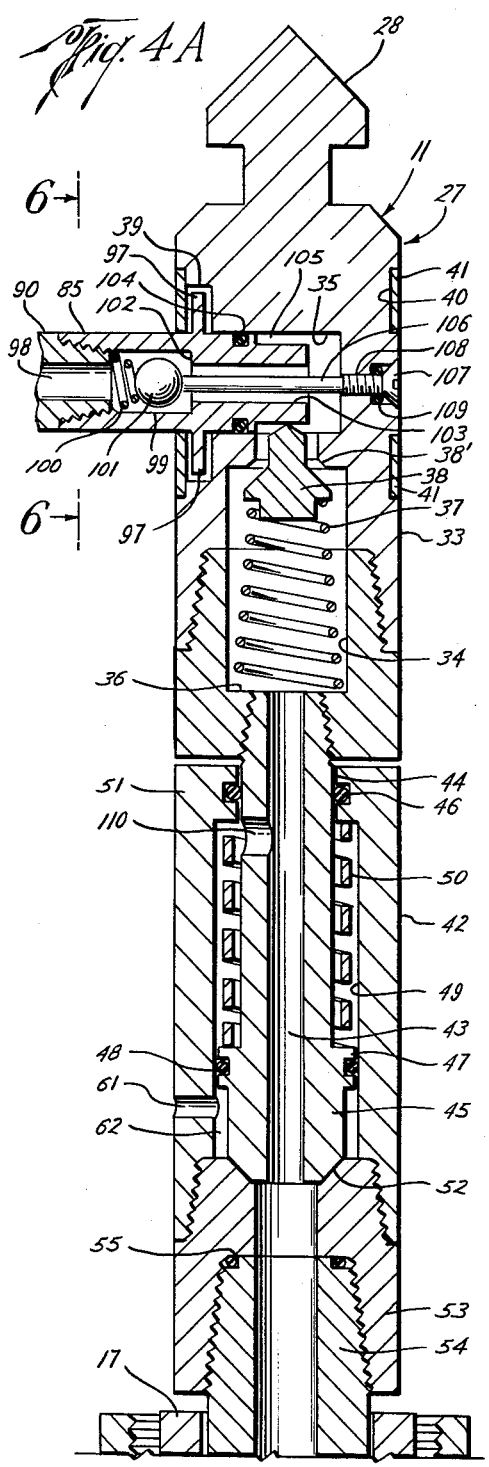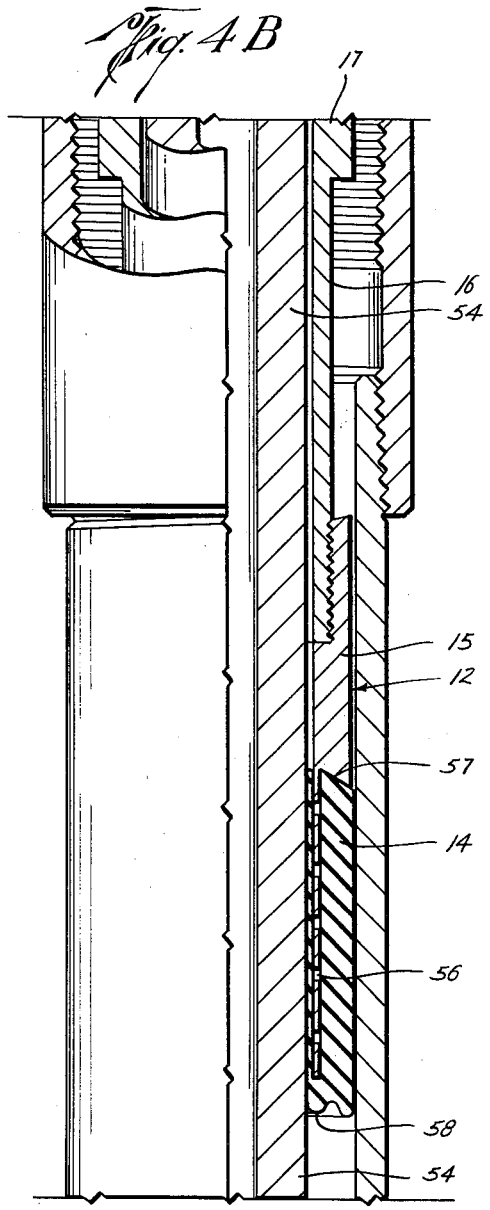

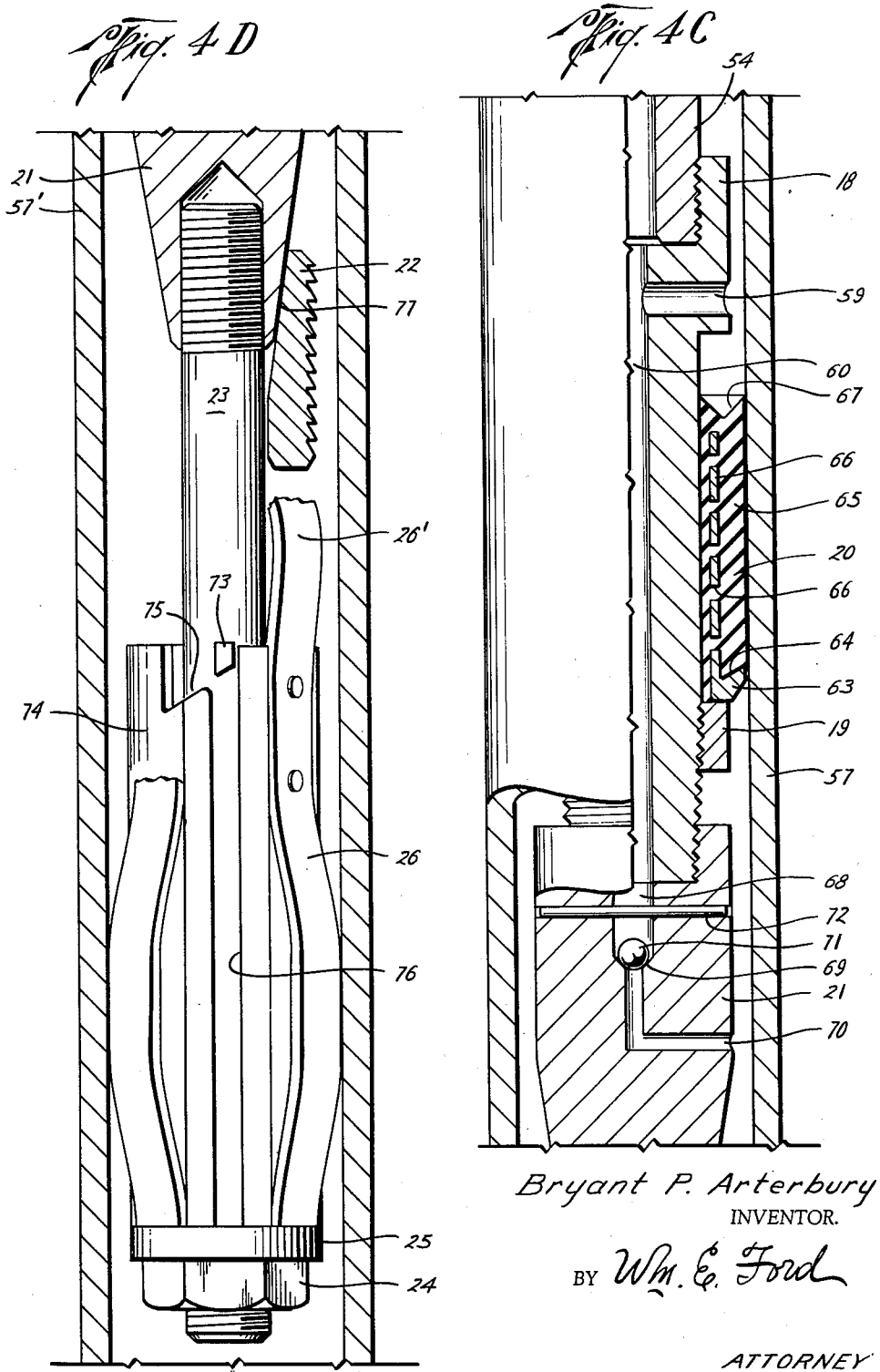

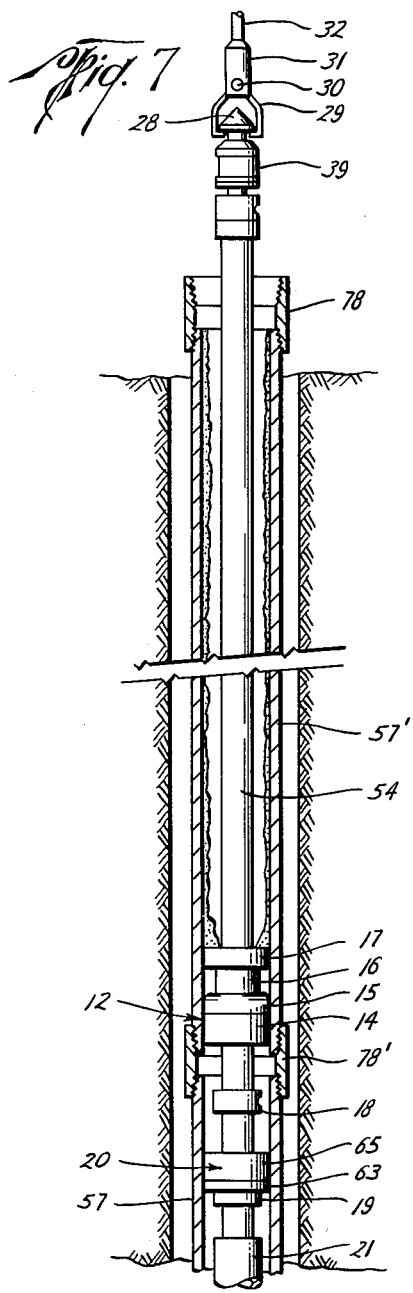
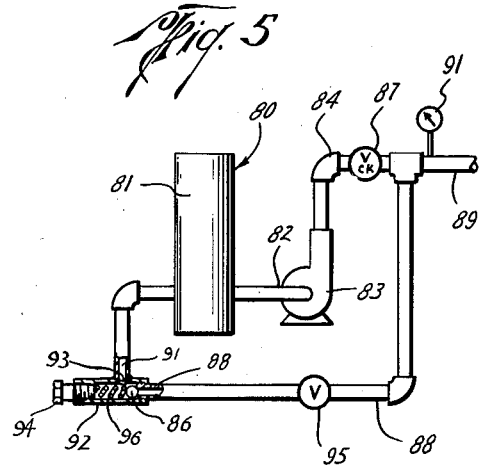
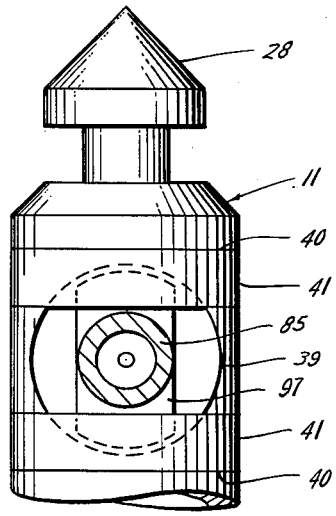
Bryant P. Arterbury
INVENTOR.
BY Wm. E. Ford
ATTORNEY United States Patent Office 2,981,331
Patented Apr. 25, 1961

2,981,331
METHOD AND APPARATUS FOR TESTING TUBING AND FOR SCRAPING MATTER FROM THE INNER WALL THEREOF

Bryant P. Arterbury, % Cavins Corp., 8701 Gulf Freeway, Houston, Tex., assignor of thirty-three and one-third percent to Roy L. Arterbury, Houston, Tex.

Filed Jan. 9, 1957, Ser. No. 633,243

3 Claims. (Cl. 166—4)

This invention relates to a method and apparatus for testing tubing and for scraping matter, as paraffin, from the inner wall thereof, the tubing tested being such as is generally used in oil wells, and the like.

In running a string of tubing into a well, especially when the tubing has previously been in service, it is desirable to test each stand of tubing and the joints therebetween as the string is assembled and lowered into the well to thereby determine whether any stand or joint may be in leaky condition or so weakened that its use may well prove dangerous. Thus faulty tubing stands and joints may be eliminated from the string to be either repaired or discarded. Also, when in previous service undesirable deposits may have gathered on the inner walls of the tubing, such as paraffin or other substances which can interfere with subsequent operation, it is desirable to remove such deposits prior to testing so that the deposit may not interfere with the accuracy of the tests, and so that such deposit will be removed prior to subsequent usage.

It is a primary object of this invention to provide an improved method and apparatus by which each stand and joint may be subjected to a predetermined measurable hydraulic pressure above any contemplated service pressures to be encountered, the apparatus being designed to be easily shifted from test position to test position, and being designed to scrape material from the inner wall of the tubing in the process of being shifted into new test position.

It is also an object of this invention to provide an improved method and apparatus of this class which will involve practically no loss of test fluid in shifts between successive test positions in those cases where it is not necessary to use pump pressure to scrape the inner wall of the tubing in the process of shifting.

Other and further objects will be apparent when the specification hereinbelow is considered in connection with the drawings in which:

Fig. 1 is a sectional elevation showing the apparatus in receipt of initial fluid prior to testing;

Fig. 2 is a sectional elevation showing the apparatus as lowered toward test position prior to setting the slips;

Fig. 3 is a sectional elevation showing the apparatus in test position and with the slips set;

Fig. 4-A is an enlarged sectional elevation of the top part of the apparatus in test position;

Fig. 4-B is an enlarged sectional elevation of the upper central part of the apparatus showing the upper packer in unset position;

Fig. 4-C is an enlarged sectional elevation of the lower central part of the apparatus showing the lower packer in set position;

Fig. 4-D is an enlarged sectional elevation of the bottom part of the apparatus showing the slips in unset position;

Fig. 5 is a diagrammatic view of the equipment for delivering pressurized fluid to the apparatus;

Fig. 6 is a sectional elevation taken along line 6—6 of Fig. 4-A; and

Fig. 7 is a sectional elevation of the apparatus in process of scraping matter from the tubing in the course of attaining position to make a subsequent test, the slips below this view, and consequently not shown, being set as shown in Fig. 3.

Referring in detail to the drawings, in which like elements are assigned like reference numerals in the various views, apparatus 10, which may be termed a combined tubing tester and scraper, as a paraffin scraper, is shown as comprising a mandrel assembly 11, on which is slidably mounted an upper packer assembly 12 comprising the packer rubber or packer proper 14, the packer holddown 15, and connected thereto the scraper 16 terminating upwardly in the hardened scraper flange or knife 17. Spaced below the upper packer, the mandrel 11 includes a connection member 18 which has a nut 19 thereon to support a lower packer 20. A wedge member 21 is connected to the lower end of the member 18 and such wedge member has a lower tapered surface to bear against and retain conventional slip jaws or segments 22 in unset position as shown in Fig. 1. A terminal rod 23 extends downwardly from the wedge 21 and has a nut 24 on the lower end thereof to support a conventional friction cage 25 which carries a series of radially spaced apart leaf springs 26 terminating in upper extensions connected to the slip jaw segments 22.

Referring in detail to Figs. 4-A, 4-B, 4-C, and 4-D, the details of construction of the elements broadly described hereinabove may be more apparent. The upper element of the apparatus comprises a spear head and valve assembly 27, having as its upper element a conventional spear head 28 to be grappled by jaws or clasps 29 pivotally mounted at 30 on a conventional wire line clamp 31 from which a conventional wire line 32 extends upwardly to the top of the well.

Below the spear head 28 the assembly 27 includes a valve body 33 of which the spear head forms an integral part. The valve body 33 has an axial passage 34 extending upwardly thereinto from the lower end thereof and joined upwardly by a radial passage 35 extending through the side wall of the valve body. A shoulder 36 is provided near the lower end of the valve body 33 to support a spring 37 which extends upwardly to bear against a valve element 38 and urge it seated against the valve seat 38' formed by an inwardly extending ring in the valve body 33 restricting the flow passage 34.

The radial passage 35 is enlarged outwardly at 39 and has annular grooves 40 in the periphery thereof to receive bands 41 therein for a purpose to be hereinafter described.

Below the valve body 27 the mandrel assembly 11 includes a valve sleeve 42 having an axial bore 49 therethrough and a reduced diameter passage 44 in the upper end thereof. A tubular valve element 45 having an axial bore 43 is connected upwardly into the valve body 33 to establish flow passage communication with the passage 34 therein, and such valve element has sealable slidable contact with an O-ring seal 46 in a groove in the head 51 of the valve sleeve 42. The valve element 45 has a flange 47 on the lower part thereof having an annular groove 48 therein to receive an O-ring to sealably bear against the wall of bore 49 of the valve sleeve 42. A spring 50 bears upwardly against the head 51 of the valve sleeve 42 and bears downwardly on the flange 47 to urge the valve element seated at 52 on the tapered inner top surface of a tubular sub or connection member 53 which forms the lower part of the valve sleeve 42 and connects it to a tubular member 54 comprising the central part of the mandrel, and making downward connection to the lower packer assembly 20. The top of the tubular member 54 is of reduced diameter to receive therearound an O-ring 55 to seal against leakage at this point. The valve element 45 provides an annular space 62 therearound below the flange 47 and a radial port 61 extends through the wall of the valve sleeve 42 to communicate with such space for a purpose to be hereinbelow described.

As has been hereinabove pointed out, the upper packer assembly 12 is slidable on the mandrel assembly 11, and in particular on the tubular member 54. The hold-down 15 to which the lower end of the scraper 16 is threadedly connected, is of reduced diameter at its lower end, and such lower end is also perforated at 56 so that the packer or packer rubber 14 moulded therearound may bond thereto, further bonded engagement being assured by tapering the hold-down 15 at 57 to bind the upper end of the packer rubber 14. Normally the packer rubber 14 is oversize for the inner diameter of the tubing 57 into which it extends, and thus the exertion of fluid pressure on the lips 58 will cause it to firmly set, such lips being formed by indenting the lower end face of the packer with an annular groove located centrally of such lower end face.

The connection element 18 to which the tubular member 54 is threadedly connected has a radial passage 59 in the head thereof which communicates with the bore 60 therethrough. The lower packer assembly 20 which is mounted on the connection member 18 includes a metallic sleeve 63 to bear upon the nut 19 and provide the modified cup surface 64 to receive the lower end of the packer rubber 65. The sleeve 63 terminates upwardly in a perforated tubular portion 66 of larger diameter than the member 18 which it surrounds, so that the moulded rubber extends on both sides thereof and bonds through the perforations. The packer 65 extends above the top of the perforated portion 66 and has the lips 67 formed therein by a V-shaped, annular groove in the upper end face of the rubber and spaced radially centrally in such end face. Thus the exertion of fluid pressure from above will extend against such groove and firmly press such lips 67 into sealing engagement, and will also force the packer surfaces therebelow into firm sealing engagement with the inner wall of the tubing 57.

The wedge 21, to which the lower end of the connection member 18 is connected, has an axial passage 68 therein reduced in diameter to form a valve a seat 69, and a radial passage 70 extending into the wedge from its periphery to communicate with the passage 68. A ball 71 serves as a valve element to seat on the seat 69 to close the passage 68 when under pressure from the interior, and a cross-pin 72 extends across the passage 68 above the ball 71 and seat 69 so that when the ball valve 71 rises under pressure for a purpose to be hereinbelow described, it cannot escape upwardly.

The rod 23 which supports the friction cage assembly 25 has a lug 73 thereon. A cam sleeve 74 inwardly of the springs 26 has a cam slot or notch 75 therein such sleeve 74 being carried by the friction cage assembly base to upstand therefrom to receive the lug 73 in the slot or notch 75 when the slips 22 are unset. This condition prevails when the tool is lowered on a wire line, as due to the right hand twist or winding of the wire line, the mandrel tends to be rotated to the right with relation to the cage assembly, thus placing the lug 73 in the slot 75. Conversely, when the slips are unset and the tool is lifted, the right hand twist of the wire line results in the lug 73 being urged to stay in frictional engagement with the wall of the slot 76. When the slips 22 are to be set the mandrel assembly 11 is rotated to the right to bring the lug 73 into position above the vertical slot 76, and then the mandrel assembly 11 is lowered while the friction cage springs 26 grasp the tubing 57 to prevent downward movement of the friction cage assembly 25. Thus the wedge 21 moves downwardly with relation to the cage 25 and the tapered surfaces 77 thereof force against the tapered surfaces of the slip segments and urge the slip segments outwardly into biting contact with the tubing 57, as shown in Fig. 3.

A means to supply a pressurized fluid, as water, to the mandrel assembly 11 is provided including a fluid system 80 as shown in Fig. 5. Such system will be described in operation hereinbelow and includes a fluid reservoir 81 from which fluid is drawn through a suction line 82 by a pump 83 to pass through a discharge line 84 to a flexible hose 89 terminating in a connection member 90 which makes connection to a nozzle 85 as shown in Fig. 4-A. A check valve 87, urged seated in direction of the pump 83, is provided in the discharge line 84. A return and/or by-pass line 88 extends from the line 84, between the check valve 87 and its connection to the hose 89, to the reservoir 81. A nipple 92 has one end threadably connected to the line 88 and has its outer end threaded to receive a plug 94 to adjust the tension of a spring 96 which urges a check ball 86 seated against the end of the line 88. When urged open this ball permits fluid to flow through a port 93 in the nipple 92 and back through line 91 to the reservoir 81. A valve, as a gate valve 95, is also provided in the line 88 for a purpose to be hereinafter described.

As shown in Fig. 4-A and in Fig. 6, the nozzle 85 has ears 97 thereon of lesser dimension from end to end than the diameter of the bore 39, so that such ends may be inserted into the bore 39 and then turned ninety degrees (90°) to be retained behind the bands 41 on the valve body 33. The connection member 90 has a passage 98 therein of lesser diameter than an outer bore 99. Thus the inner end of the connection member 90 provides the shoulder against which a spring 100 bears to urge a ball 101 toward a seated position at a shoulder 102 to close a flow passage 103 through which fluid is delivered to the passage 35 in the valve body 33. An annular groove is provided in the nozzle 85 to receive an O-ring 104 to seal against leakage from the passage 35. The nozzle 85 has an inner end 105 which extends past the center of the valve body 33 to depress the valve element 38 to open the flow passage 34. A bolt 106 is provided to hold the valve 101 unseated. Such bolt has a countersunk head 107 to fit within the wall of the valve body 103, the shank of such bolt 106 being threaded at 108 to fix the bolt to the body 33 while the head 107 presses against an O-ring seal 108 in a recess 109 in the body wall to seal against leakage.

The operation of the invention can be understood in detail from a consideration of Figs. 1, 2, 3, and 7. As the first step, with the apparatus suspended by a wire line 32 into a tubing 57 to be tested, and with the tubing supported at the top of the well by means not shown, as by conventional slips, the upper packer 14 must be above the top of the joint or coupling 78' at the top of the tubing 57 so that a hose 79 may be inserted therebelow to fill the test space with test fluid, as water. In this case the lower packer 65 may be positioned as shown in Fig. 1 with the slips 22 unset in the tubing 57' therebelow and with the friction cage 25 frictionally grasping the wall of the tubing 57' below the slips 22.

After the tubing 57 and therewith the apparatus 10 has been substantially filled the apparatus is lowered to a position slightly below that shown in Fig. 2 to position the upper packer 14 at substantially the top of the tubing 57 to be tested and to thus position the lower packer 65 down in the tubing 57' and below the coupling 78 to be tested. Obviously the distance between the packers must therefore exceed the length of a tubing 57 and coupling 78.

At this point a blank nozzle 85 is inserted in the valve body 33, such nozzle being identical with that shown in Fig. 4-A except that the connection member 90 is not required, nor the hose 89 shown in Fig. 5. The insertion of such blank nozzle 85 opens or unseats the valve element 38. With the valve element 38 thus unseated the mandrel assembly 11 is raised and therewith the lower packer assembly 20 while the upper packer assembly 12 retains its position by virtue of its frictional engagement with the tubing 57. This raising of one packer with relation to the other first forces any entrapped air out of the apparatus 10 through the blank nozzle 85, and when water follows the entrapped air in flowing out of the blank nozzle there is indication that all of the entrapped air has been removed and raising of the mandrel assembly 11 may be discontinued and the blank nozzle 85 may be removed to let the valve element 38 seat.

At this point lifting of the apparatus 10 is continued with the result that the wire line 32 twists to the left as viewed in plan view from the top of the well. This inherent twist in the wire line causes the mandrel to rotate to the left, as similarly viewed, and thus the lug 73 is moved along the cam surface 75 to the position shown in Fig. 4-D above the vertical slot 10. Then the lug 73 may move down the vertical slot 10 as the wire line may be lowered so that the mandrel assembly 11 moves downwardly to move the wedge 21 therewith to urge the slip segments 22 outwardly into biting contact with the tubing 57' as the friction springs 26 engage the tubing 57' and resist downward movement of the friction cage 25 while the members 26' of such friction cage assembly 25 hold up the slip segments 22 against downward movement with the mandrel assembly 11.

Upon raising the mandrel assembly 11 to urge entrapped air from the apparatus 10, relative movement has occurred between the mandrel and the upper packer assembly 12 so that a space or separation occurs between the top of the scraper 17 and the lower face of the sub 53. Now, when the slips are set, this space or separation continues as the suction of the downward movement of the lower packer assembly 20 will draw the upper packer assembly 12 downwardly therewith.

At this point the nozzle 85 is inserted in the valve body 33 and turned ninety degrees (90°) to lock the ears 97 behind the bands 41, such nozzle being connected to the hose 89 extending from the line 84 by means of the connection member 90. Then the valve 95 may be closed and the pump 83 started to build up pressure as indicated on the gauge 91. As water is supplied into the apparatus 10 it may pass therefrom through the opening 59 into the annular space within the tubing 57 between the packers 14 and 65 to lift the upper packer assembly 12 to place the scraper 17 in abutment with the sub 53 as shown in Fig. 3. Then the pump continues to run to build up pressure until the tubing 57 is under the desired test pressure, such as 10,000 to 15,000 pounds per square inch. The pump may then be stopped with the result that the check valve 87 seats. Then the gauge 91 may be observed to see if it remains static to indicate that there is no leak in the tubing 57 or coupling 78 under test, or if it falls off to indicate a leak in the tubing 57 and/or the coupling 78.

If a leak is indicated such tubing or coupling must be removed from the pipe string and repaired or replaced. If no leak is indicated the tester is readied to test a subsequent section of tubing and coupling. To this end the valve 95 is opened to permit fluid, as water, to unseat the valve 96 and return to the reservoir 81. Then the nozzle 85 is removed from the valve body 33 to permit the valve element 38 to seat upon the valve element 38'.

The next section of pipe 57' to be tested may now be added to the coupling 78', such pipe section having a coupling 78 on the upper end thereof. Then the section 57' with the coupling 78 thereon is lowered to the position shown in Fig. 7, while the tester, with the slips 22, must follow therewith. Then the wire line clamp or overshot 31 which has been removed during previous testing, is now lowered to grasp the spear-head 28 to pull upwardly on the assembly 27 and therewith on the wedge 21 to unset the slips 22.

In the event the bore of the tubing section 57' is free of any deposit, the upper packer assembly 12 will be lifted by the column of fluid between the packers when the overshot is pulled upwardly and the upper packer brought to the position shown in Fig. 2, while the lower packer assembly 20 is also brought up to its position as shown in Fig. 2, as lifted by the nut 19 on the connection member 18. After attaining this position the assembly 27 is lowered to set the slips 22 as shown in Fig. 3, and as hereinabove described. At this point the nozzle 85 is inserted in the valve body 33 to make up any fluid, as water, lost in movement to this test position, and testing is then conducted as hereinabove described.

However, in cases where the bore of the tubing section 57' to be tested may have a deposit as paraffin therein, as shown in Fig. 7, the upward movement of the scraper blade 17, and the packer assembly 12 therebelow, will be retarded as the tester is lifted to a subsequent testing position, with the consequence that the scraper blade 17 hangs up on the accumulation of scraped material, as paraffin. In this case the column of test fluid, as water, between the two packer assemblies, must pass back into the assembly 27 through the port 59, and upwardly to lift the valve element 45 against the tension of the spring 50, and to pass out the escape port 61, the tension of the spring 50 being set at some pre-determined pressure as 2,000 pounds per square inch above which it is not safe to pull upwardly on the wire line 32 without danger of breaking it.

At this point the feature of construction is pointed out whereby the valve element 45 is of lesser diameter than the bore 49 above the flange 47 and has the passage 110 from the bore 43 to communicate with the bore 49 to thereby admit fluid at the pressure attained in such bore 43 into the bore 49 around the spring 50 to bear downwardly against the top of the flange 47 and normally maintain seated balance of the valve element 45.

When the tool is being raised to test a new section 57' to be tested, if the scraper blade 17 hangs up in the bore because of paraffin or the like then it becomes necessary to set the slips and insert the nozzle 85 in the valve body 33 and start up the pump to supply test fluid into the tester at such a pressure that it will pass through the port 59 to enter the space between packer assemblies 12 and 20 to set the lower packer 65 and to force the upper packer assembly 12 upwardly to the position occupied in Fig. 2. Then the assembly 27 may be lowered to set the slips 22, as shown in Fig. 3. Then the nozzle 85 is inserted in the valve body 33 and the pump 81 started up to build up fluid pressure in the tester, and by force of this hydraulic action the upper packer assembly 12 is elevated as the testing column of fluid is restored, and the packer assembly 12 moved from the position of hang up, shown in Fig. 7, upwardly therein to the same position as it is shown occupying in Fig. 3. This elevates the blade 17 above the top of the coupling 78 and ejects the material which the blade 17 has removed from the bore, such as paraffin deposit.

The invention provides a tubing tester which under normal conditions will operate without having to have but a minimum of any of the testing fluid replaced. Also in case the scraper 17 hangs up on a deposit in the bore of a section to be tested, as when a paraffin deposit is encountered, the escape of the test fluid as the assembly 27 is lifted, gives indication of this occurrence so that the operation of supplying replacement test fluid to operate on the upper packer 17 and move it as a hydraulic ram, is positively indicated as the next necessary operation.

Broadly, this invention considers a tubing tester which is positive and facile of operation and which employs a slidable upper packer, including a scraper to scrape the bore of a tubing section prior to testing when necessary. The invention is not limited to the exact description and drawing disclosure set forth herein, but other variations and modifications of the structure and method are included such as may fall within the spirit of the invention and within the scope of the appended claims.

What is claimed is:

1. The method of testing tubing as it is being made up and lowered into a well and in scraping matter from the inner surface thereof which comprises the steps of establishing vertical spaced packers in the tubing with the upper packer carrying a scraper thereabove, supporting the lower packer within the tubing into position below a stand thereof to be tested, applying fluid pressure to the space between packers to move the upper packer to test position at the top of the stand to be tested, the scraper thereby scraping matter from the inner surface of the stand while in transit, and thereafter applying measurable fluid pressure to the space between packers and observing whether the pressure decreases due to leakage and if the tubing tested does not leak attaching an additional stand of tubing to the string in the well, lowering the string and attached stand while the packers remain supported in the string, and drawing the packers upwardly into a position to test the attached stand, and repeating the test.

2. The method of testing a plurality of lengths of tubing and the joints connecting the same and in scraping matter from the inner surface of the tubing which comprises the steps of vertically positioning space confining means therein with the upper space confining means carrying a scraper and with the lower space confining means supported below a joint and a section of tubing thereabove to be tested, applying fluid pressure to the space between the space confining means to move the upper space confining means to position at the top of the section to be tested, the scraper thereby scraping matter from the inner surface of the section while in transit, and with the upper space confining means in position there being established a longitudinally movable confined space within the interior of the tubing that is of such length as to at least extend through the length of a section and the joint on the lower end thereof, applying measurable fluid pressure to said confined space and observing whether the pressure decreases due to leakage that may occur through the particular section and joint interval being tested, moving said space confining means substantially the same distance as that moved in unison with the tubing but in opposite direction after each of said steps, and applying measurable fluid pressure to said confined space after each of said steps.

3. A well tool to serve as a combination tubing tester and scraper to successively test a tubing string section by section as it is run into a well, said tool including a tubular rod providing an upwardly facing valve seat on the upper end thereof controlling fluid entry thereinto, said rod having a closed lower end and with the interior thereof providing a flow passage, two vertically spaced apart packers on said rod and connected thereby and adapted to seal between said rod and the section being tested with the upper packer being slidable on said rod, a scraper carried on the upper part of said upper packer to extend thereabove, the lower packer being connected to said rod and during testing said lower packer being positioned on said rod in the tubing string below the section being tested, opening means provided through the wall of said rod above said lower packer into the space in the section being tested, slip means attached to said rod to support it in the tubing string, an upper valve including a valve body with upper end adapted to have lifting and lowering means connected thereto and providing a flow path therethrough with upper end opening outwardly, a valve member in said valve body, and resilient means yieldably urging said valve member outwardly normally to close said flow path, a lower valve including a valve tube connected to said valve body to communicate with said flow path and extending therebelow and having a valve element thereon, a valve sleeve with lower end connected to the upper end of said rod and with said valve sleeve providing an outlet passage therefrom above such connection, said valve sleeve slidably and sealably enclosing said valve tube therewithin and providing a downwardly facing shoulder, a spring within said valve sleeve bearing upwardly against said shoulder and downwardly against said valve element to urge it seated on said valve seat, said spring being tensioned to permit said valve element to be urged toward said shoulder responsive to fluid pressure from said rod in excess of a predetermined pressure acting thereagainst, said tool including means to urge said valve member against said resilient means to open said flow path to supply pressure fluid through said upper and lower valves into said rod and out through said opening means into the tubing section space between said packers and to thereby lift said upper packer upwardly on said rod to the upper end of a succeeding tubing section to be tested and thereby to lift said scraper therewith to scrape any matter from said succeeding tubing section.

References Cited in the file of this patent
UNITED STATES PATENTS

| 1,217,066 | Rhodes | Feb. 20, 1917 |
| 2,610,691 | Berry | Sept. 16, 1952 |
| 2,652,717 | Bush et al. | Sept. 22, 1953 |